Jan. 13, 1959     W. J. LANDUS     2,868,592
WINDOW SEAT
Original Filed Nov. 1, 1946
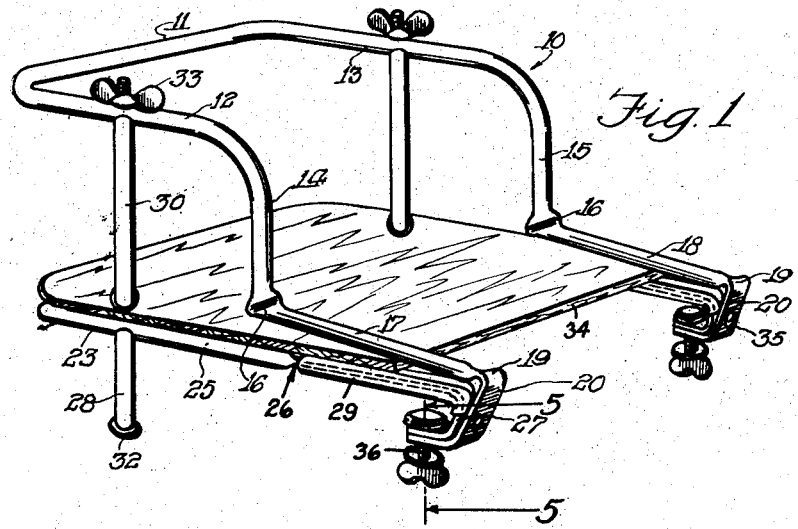
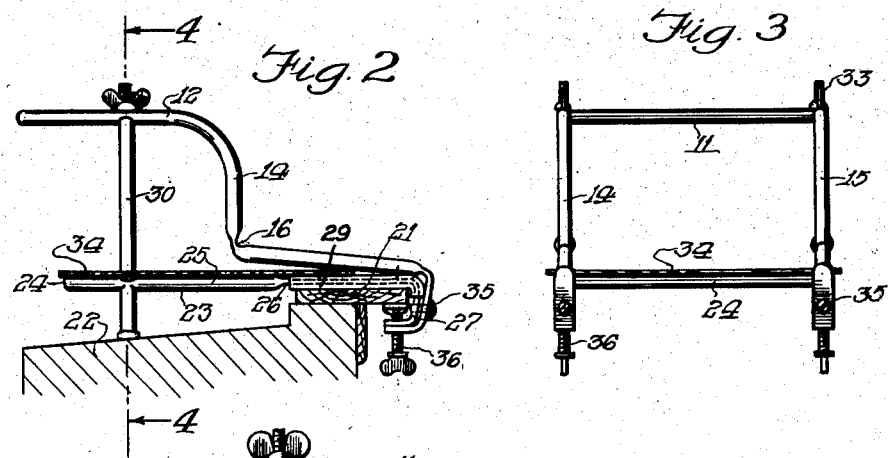
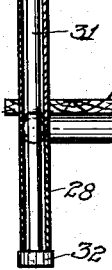
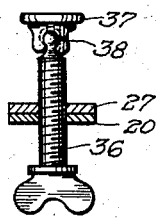
Inventor:
Warren J. Landus
By Henry Hech
Attorney

United States Patent Office 2,868,592
Patented Jan. 13, 1959

2,868,592
WINDOW SEAT
Warren J. Landus, Chicago, Ill.
Continuation of application Serial No. 707,253, November 1, 1946. This application November 23, 1951, Serial No. 257,681

9 Claims. (Cl. 304—24)

This invention pertains to seat structures, especially those intended for use in washing the outer side of windows, the present application being a continuation of my application, Serial No. 707,253, filed November 1, 1946, now abandoned.

Various types of window seats of this class have been proposed heretofore, but the prior devices have been subject to one or more objections, such as ungainly appearance, excessive weight, structural complexity, cost of manufacture, or shortcomings in features of safety and general practicality.

The seat structure disclosed herein is characterized by light weight, a simple yet sturdy structural novelty with ease of assembly and disassembly, and low manufacturing cost.

One of the important structural objects of the invention is the formation of a seat frame member and a back guard member from separate lengths of light-weight metal tubing, each having a pair of safely hooks interfitted with a pair of hooks of the other to engage a window sill jointly while at the same time serving as a reinforcement and a structural interconnection for the two members.

Another object is the provision of tubular legs and aligned tubular spacing braces joined by a removable bolt means therethrough acting to rigidify both the legs and braces yet permitting a dismantling of the seat for shipping or stowage purposes.

Another object is the provision of a thin seat member which rests upon the seat frame and is held in position by passage therethrough of the aforesaid bracing spacers.

Another object is the provision of tubular frame members, parts of which are offset in a certain manner for window-clearance, and end portions of which are flattened and hooked to nest in closely fitted pairs.

Additional objects and aspects of novelty and utility reside in details of the construction and operation of the illustrative embodiment of the device described in view of the appended drawing, in which:

Fig. 1 is a perspective view of a seat constructed in accordance with my invention;

Fig. 2 is a side view of the seat mounted on a window sill structure;

Fig. 3 is a front view of the seat;

Fig. 4 is a fragmentary enlarged section on the lines 4—4 of Fig. 2;

Fig. 5 is a section on lines 5—5 of Fig. 1.

The novel seat structure 10 is shown fully assembled in Fig. 1, and consists of a back or guard frame formed from a single length of metal tubing bent into U-shape with a rearward or bight portion 11 and opposite side arms 12 and 13 respectively curved downwardly then forwardly, as at 16, to provide front arms or opposite endwise projections 17 and 18, which are both flattened, as at 19, and bent to provide hook members 20 capable of engaging around the inner edge 21 of a window sill structure (Fig. 2).

The seat structure further includes a lower seat-frame member 23 likewise made of a single length of metal tubing which is bent into a substantially U-shape complementary to that of the guard member, so as to underlie the latter as in Fig. 1, with a rearward bight portion 24 (Fig. 3) substantially underlying the bight portion 11 of the guard, and a pair of oppositely situated side arms 25 respectively underlying arm portions 14—15, 17—18 of the guard, it being noted that the lowered extensions 17, 18 of the guard are brought down in close proximity and near parallelism with the seat frame extensions 25, primarily to afford a maximum clearance so that the sliding sash-type window may be lowered fully to the limit permitted by the legs of the occupant of the seat, and for the further purpose of overlying a seat member 34, as will appear.

The forward endwise portions 25 of the tubular seat frame are also flattened, as at 26 (Figs. 1 and 2), and bent back to form hooks 27 respectively adapted to lie in nested, interfitting or overlapping relation with the back-guard hooks 20 situated on corresponding sides of the seat.

Spaced rearwardly from the hooks 19, toward the bight 24 of the seat frame, are short tubular metal legs 28, one under each of the side portions 25, and these legs are preferably permanently attached, as by welding or brazing, to members 25.

Preferably, each of the forward flattened end portions 26 of the seat frame extensions, and at least a portion of the appurtaining hook 27, is provided with a rubber or like sleeve 29 to prevent moving of the window sill portions on which these parts normally rest when the device is in use (as in Fig. 2).

A vertical, tubular bracing and spacing member 30 is aligned with each of the legs 28 between the side arms 12 and 13 and their respective underlying seat frame portions 25, the ends of these members 30 being chamfered or shaped to interfit closely with the curvature of the tubular members 12 and 25, for example, between which these braces are fitted.

The legs 28 and bracing spacers 30 of each pair are provided with a tie bolt or rod 31 (Fig. 4) passing interiorly therethrough, and through the appurtaining frame tubing, the tie bolts being headed at their lower ends 32 and being threaded at their upper ends to receive retaining means, such as wing nuts 33, which are turned down to draw the frame parts, spacers, and legs tightly together.

A seat board 34 is removably mounted on the seat frame by means of apertures or cut-outs at its opposite sides which interfit with the bracing spacers 30, the seat board otherwise resting on frame portions 23, 24, 25, 26, and being also held down at its forward ends by the closely overlying guard arms 17 and 18.

Preferably, the interfitted or nested sill and assembly hooks in each pair are removably secured together by means of screws 35 engaged therein.

A clamping screw 36 is threaded into and through the lower reentrant or recurving portions of both of the nested hooks of each pair, said screws being of a type shown in Fig. 5 and having a head 37 fitted with a split socket to removably engage and rock upon a ball head on the screw, as at 38.

The clamp screws 36, themselves, will suffice to maintain the nested hooks of each pair in interfitted or assembled relation so that there would be no danger of these hook parts disengaging if screws 35 were omitted.

However, since the clamp screw heads 37 are made removable for those who do not wish to trouble using one or both of the same, for added safety, and in anticipation that one or both of the clamping screws might be thus removed, the safety screws 35 are provided, since the interfitting or nesting of the hook parts 20, 27 is an important assembly feature by which the two frame members are further rigidified and maintained in assembled condition; and for purposes of safety, accidental separation of the hooks of each pair is to be avoided.

The manner in which the novel seat is intended to be installed and used on the conventional window sill structure is thought to be apparent from Fig. 2.

It will now be apparent that the novel seat consists of relatively few parts of simple structural character, namely a seat board, a pair of tubular frames made of single lengths of tubing secured together by means of interengaged sill hooks and a pair of spacers with tie bolts. Assembly and disassembly are equally simple. The tubing is utilized and joined structurally in a manner to afford a minimized weight with adequate strength, particularly at the critical hook formations (without which such a device would be dangerous to the point of impracticality).

I claim:

1. In a window seat structure, a seat frame formed from a length of metal tubing curved to bring its opposite endwise portions into approximate parallelism, the extremities of said portions each being turned back to define a sill-hook; a back-guard frame similarly formed from a length of metal tubing curved to bring opposite endwise portions adjoining a rearward bight into approximate parallelism, spacing and bracing means extending vertically from said seat frame, a rearward portion of said guard frame being supported on said spacing and bracing means above the horizontal level of the seat frame, said endwise portions of the back frame also being turned downwardly to extend into conjunction with the sill-hook portions of the seat frame, and the extremities of said downwardly-turned parts being turned back to define hook conformations adapted to encompass the sill hooks on corresponding sides of the seat frame to form nested double hooks respectively adapted to hook onto the edge of a window sill, means for securing each pair of nested hooks against separation, whereby the nested hooks serve both as a sill-engaging means and a means for securing the conjunctive endwise portions of the two frames in assembled relation.

2. A seat construction according to claim 1 and further characterized by the provision of a flat seat body adapted to rest upon said seat frame and having cut-out portions closely interfitting with said vertical bracing and spacing means to maintain the seat body in position upon the seat frame.

3. A window seat comprising a pair of U-shaped frames one adapted to overly the other in alignment to define a seat frame and a guard frame therefore, a vertical spacing arm secured between the seat frame and overlying guard frame on each side of the seat structure, a flat seat member resting on the seat frame and having a cut-out on each side thereof to interfit with the spacing arm on the corresponding side of the seat structure whereby to maintain the seat member in a predetermined position on the seat frame, said frames having their respective end portions turned into hooks, the hooks of the guard frame closely embracing the hooks of the seat frame in nested pairs on opposite sides of the seat structure, said pairs of hooks being adapted to hook onto the edge of a window sill.

4. A construction according to claim 3 in which said guard frame has its opposite endwise portions turned down a substantial distance rearwardly of said nested hooks to overlie said seat member in proximity sufficiently close thereto to prevent substantial upward separation of the seat member from the seat frame.

5. A window seat comprising a seat frame formed by a single tubular member curved to provide opposite forward ends, a complementary overlying back and arm frame on said seat frame and formed by a single tubular member curved to provide opposite forward ends, the forward ends of said members on corresponding sides of the seat being flattened and hooked to overlap and jointly hook in nested pairs around the inner sill portion, and means common to each pair of nested hook ends for clamping the same to the inner sill portion.

6. A window seat comprising a seat frame having legs for standing on the outer sill portion, a seat board carried on said seat frame, a back and arm frame on said seat frame, integral endwise extensions on said frames continuing forwardly and bent into interfitted nesting pairs of hook-shaped ends to encompass the inner sill portion, said hook-shaped ends being secured together, at least, by screw-clamp means threaded into each pair of ends for clamping the respective pairs of hooks to the sill.

7. In a window seat, a seat frame made of a single length of metal tubing and having attached legs for standing on the outer sill portion, a back and arm frame on said seat frame and also made of a single length of metal tubing, braces secured to said frames, integral, oppositely situated side-arm extensions on said frames and continuing forwardly and respectively flattened and bent into opposite pairs of nested U-shaped hook ends to encompass the inner sill portion, said U-shaped hook ends on corresponding sides of the seat being secured together in nested pairs, and means threadably engaged in each said pair of ends for clamping the U-shaped hook ends to the sill.

8. A window seat comprising a seat frame having legs for standing on the outer sill portion, a seat member carried on said frame, a back and arm frame above said seat frame, opposite, integral side-arm extensions on both sides of said frames and continuing forwardly into conjunction and bent into recurving nested sets of hooks to engage the inner sill portion, adjustable means operatively engaged with each set of hooks preventing separation of the same and for clamping the same to the sill, and spacing members respectively aligned with said legs between the seat and back frame and attached thereto for maintaining the arms at proper distance from said seat frame.

9. In a window seat, separable back and seat frames of approximate U-shape and each made of a continuous elongated member having opposite free ends bent down into a sill-engaging hook, the hook on each side of said back frame being of a size to receive within it in nesting relation the hook on the corresponding side of the seat frame; sill clamping screw means threadedly engaging and conjoining each pair of nested hooks; brace means interposed between the seat and back frames, and threaded means removably securing at least one of said frames to said brace means.

References Cited in the file of this patent

UNITED STATES PATENTS

| | | |
|---|---|---|
| 268,899 | Howell | Dec. 12, 1882 |
| 410,957 | Crook | Sept. 10, 1889 |
| 724,799 | Buckel | Apr. 7, 1903 |
| 846,904 | Brady et al. | Mar. 12, 1907 |
| 859,560 | Hyde | July 9, 1907 |
| 1,252,386 | Bernek | Jan. 8, 1918 |
| 1,438,704 | Gaitman | Dec. 12, 1922 |
| 1,601,279 | Wolfe | Sept. 28, 1926 |
| 1,723,654 | Morrissey | Aug. 6, 1929 |
| 1,930,369 | Nevin | Oct. 10, 1933 |
| 1,945,113 | Kloboucnik | Jan. 30, 1934 |
| 2,282,133 | Horton | May 5, 1942 |
| 2,532,590 | Anastasi | Dec. 5, 1950 |